United States Patent [19]
Aschberger

[11] 3,769,846
[45] Nov. 6, 1973

[54] MULTIPLE POSITION SEAM INDEXER
[75] Inventor: Anton A. Aschberger, Oak Lawn, Ill.
[73] Assignee: Continental Can Company, Inc., New York, N.Y.
[22] Filed: May 13, 1971
[21] Appl. No.: 142,958

Related U.S. Application Data
[62] Division of Ser. No. 848,808, Aug. 11, 1969, Pat. No. 3,617,679.

[52] U.S. Cl. .................................... 74/23, 219/64
[51] Int. Cl. ............................................ F16h 21/00
[58] Field of Search .................... 74/23, 54; 219/64

[56] References Cited
UNITED STATES PATENTS
3,654,810  4/1972  Aschberger.......................... 74/54
3,544,753  12/1970  Aschberger........................ 219/64

Primary Examiner—Charles J. Myhre
Assistant Examiner—Wesley S. Ratliff, Jr.
Attorney—Americus Mitchell, Joseph E. Kerwin and William A. Dittmann

[57] ABSTRACT

An indexer for turning a can on which the seam has not been fully welded so that the welding current goes through two or three positions on the surface of the electrode as successive can seams are turned to these positions by the indexer. The electrode erodes in definite patterns. This prolongs electrode life.

5 Claims, 6 Drawing Figures

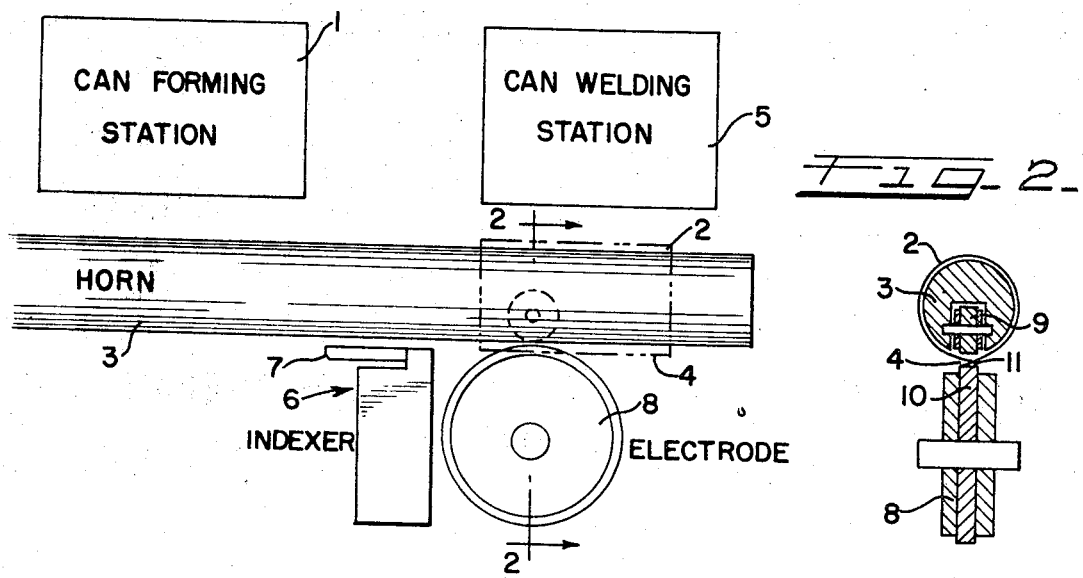
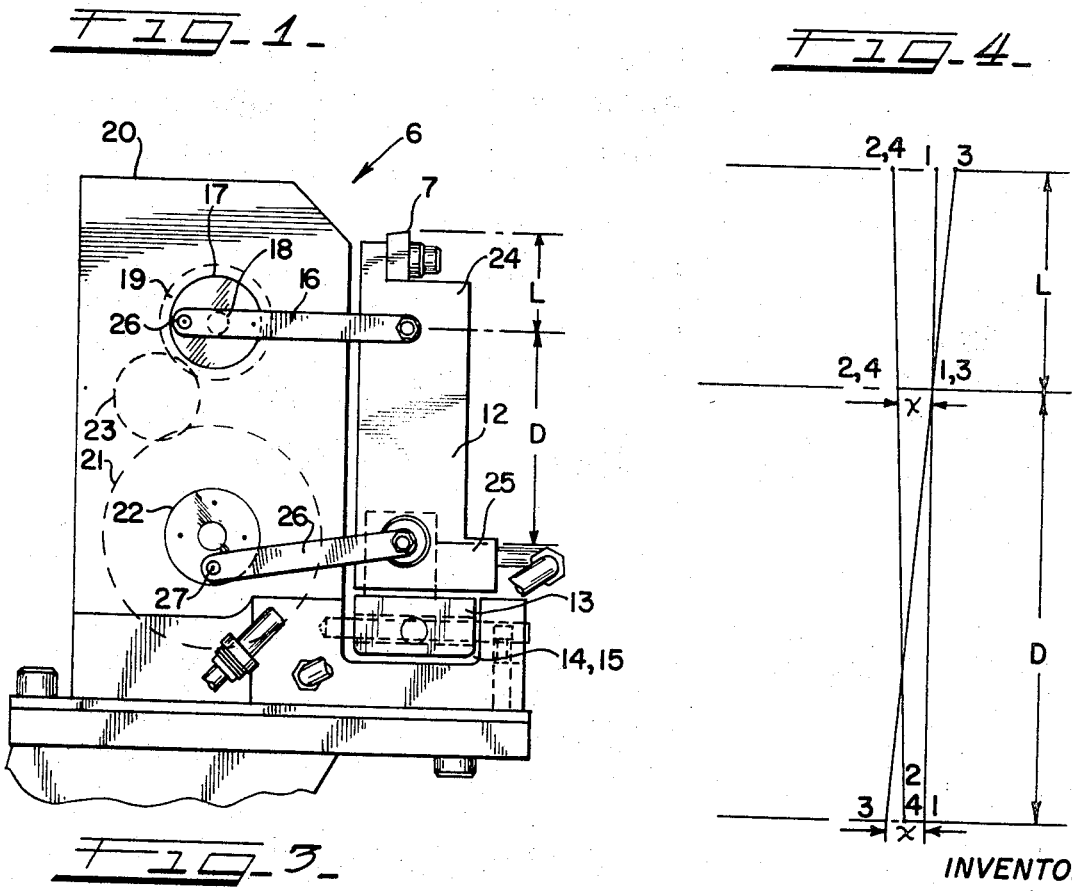
INVENTOR
ANTON A. ASCHBERGER
BY Lawrence Mitchell ATT'Y.

Fig. 5.
Fig. 6.
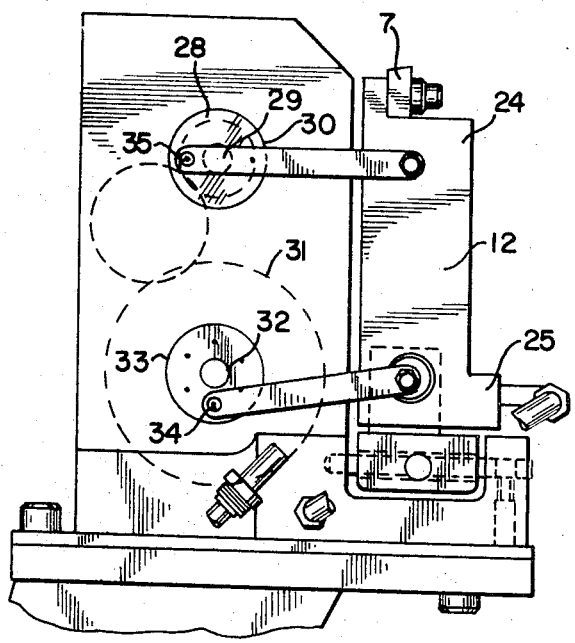
INVENTOR
ANTON A. ASCHBERGER

MULTIPLE POSITION SEAM INDEXER

This case is a division of co-pending application Ser. No. 848,808, filed Aug. 11, 1969, now U.S. Pat. No. 3,617,679, in the name of Anton A. Aschberger, entitled Can Body Making Method, and assigned to the same assignee as this invention.

My invention is drawn to a can weld indexer and particularly to a machine for turning successive can seams to various predetermined positions before welding the seams.

Can seams are welded usually at a certain spot on the welding electrodes in most machines in use today. The electrode contacts the can seam at approximately the same spot time after time and a furrow having a rather sharp edge is formed in the electrode. Since can blanks are of somewhat different size and consistency, the can seam is not presented to the electrode at exactly the same point each time. This results in different pressures and different electrical currents at different parts of the seam. High electric current concentration at various points may cause uneven heating and a burn-through and a leaky can under pressure. For these reasons, electrodes used in can seam welding are replaced fairly often.

The dual problems of electrode pitting or grooving and production of leaky cans are of long-standing in the can welding art.

It is a primary object of this invention to present can seams to an electrode at the same point or points in each of successive welding cycles.

It is another object of this invention to spread electrode erosion and pitting at two or more points on the surface of the electrode. The number of points depends on electrode width.

It is another object of this invention to avoid burn-through of can walls.

It is a final object of this invention to weld successive cans without burn-through.

Other objects and advantages will become apparent from the following description taken in conjunction with the accompanying drawings in which:

FIG. 1 is a diagrammatic sketch of the sequence of operations of my invention.

FIG. 2 is a sectional view of an unwelded formed can body blank taken along Line 2—2 of FIG. 1.

FIG. 3 is a side view of an embodiment of my invention.

FIG. 4 is a diagrammatic sketch of the stages of the pusher element of the two position indexer embodiment.

FIG. 5 is a side view of the three position indexer.

FIG. 6 is a diagrammatic sketch of the stages of the pusher element of the three position indexer.

Briefly, my indexer accurately concentrates the electrode wear to sections on the face of a welding electrode by moving the unwelded side seam of successive cans to two or more precise positions on the face of the electrode. In this way, grooves are accurately worn into the face of the electrode and the electrode does not produce leaky cans for a long time. In order to do this, an elongated pusher element moves horizontally to catch the lip of the elongated element against the wing edge of the formed can and rotate the can a certain amount on the mandrel to present the can weld seam to certain spots on the electrodes. The welding electrodes are now pressed against the can, and as the can moves past the electrodes, the side seam of the can is welded. The elongated element is moved by rotating eccentric cams.

Referring now more particularly to FIGS. 1 to 6, a description of the embodiments of my invention follows:

The improvement of my invention is to precisely locate can seams in one or more positions in relation to the electrode.

The generalized diagrammatic illustration of a section of a can body forming machine is shown in FIG. 1 wherein a wing forming station 1 bends the can blank 2 down around a mandrel 3 to form an overlapping wing 4 of the can at the bottom. After the can has been formed around the mandrel, it is moved along to a can weld station where it is welded. A variety of operations may be performed between the wing forming station 1 and the can welding station 5. The indexer 6 which is the subject of this invention, is located in the space between the wing forming station and the can welding station. The outer portion 4 of the overlapped section of the formed can sticks out a bit (FIG. 2). As it is initially positioned on the can welding station, the can overlap section does not press against the mandrel 3. The indexer lip 7 rotates the can a predetermined amount on the mandrel and the amount of movement is usually very small. The can seam is now precisely located by the indexer and the can may now move at a moderately rapid pace between the horn mandrel 3 and the welding electrode mandrel wheel 8 to weld the can seam. As seen in FIG. 2, the outside overlapped can body edge presses against the welding electrode 8 and the current coming from the electrode 9 is to some extent concentrated at the point 10. This causes the electrode 8 to erode and pit along the line of the can body blank edge 11. Since the successive can body blanks are presented to the can welding station with the same orientation, one or more grooves is worn in the electrode fairly rapidly at the point of concentration.

When a succession of cans has been formed on the mandrel, the overlap of each of the various cans is not always exactly the same dimensions. Because of this fact, when the edges forming the can overlap are pressed together, a grossly unequal pressure is applied across the overlap. The overlapped parts which are pressed into contact with each other most firmly conduct electricity most readily. The heating caused by the electric current tends to be concentrated in the area that is most firmly pressed together. A large welding current passing through a small section of the can body overlap may burn longitudinal fissures through the can body. When pressure is applied inside such a can, the can is found to be leaky.

When can seams are presented to an electrode with the same orientation time after time, the heating of the can seam is concentrated at one spot on the electrode. Electrode erosion at the one spot is rapid and in a relatively short time, an unacceptable number of the cans produced leak along the weld line.

In order to avoid the detrimental results set forth in the paragraphs above, my indexer moves the can body to a predetermined different point each time a new can passes the indexing station. By moving the can body seam to two or three predetermined points across the face of an electrode, successive can bodies are welded without moving the can body to the point of contact with the can seam to the electrode. The electrode/cam seam position is previously determined and certain areas on the face of the electrode are worn. By wearing only certain areas and precisely orienting the can seam with regard to these areas, time after time, satisfactory welds are produced over a long period of time.

The two position embodiment of my invention shown in FIG. 3 has a vertically elongated member 12 adapted to reciprocate to and fro as each can is presented to the can indexing station. This member 12 has a pushing element 7. The pusher element is made of a fairly hard material to avoid wear and to present the can lip to a predetermined place each time. The pusher element 7 presses against the edge of the can body blank as indicated above and moves the can body blank wing and edge a predetermined distance to the pedetermined position in regard to the electrode. The can is thus turned on the mandrel.

Underneath the vertically elongated member 12 is a trunnion element 13 which may be mounted to slide on two rods 14,15 shown one behind the other in FIG. 3. The vertical member 12 is pivotally connected to an upper connecting link 16 which connects the upper end of the member to a first eccentric cam 17. The cam 17 is pinned to an upper shaft 18 (FIG. 3) extending through a rotary motion transmitting means, such as a gear 19 mounted inside the gear box or gear mounting means 20. This gear rotates another gear 21 below it to operate a second eccentric 22 which is thus synchronized with the first eccentric. The upper gear 19 may be connected to the lower gear through idler gear 23. The two eccentric cams 17,22 control the relative movement of the upper and lower portions 24,25 of the vertical member through their respective link means 16,26. The movement of the pusher member lip 7 is thus controlled by the relative movement of the cam as described above.

In order for the pusher element to be moved a varying distance each consecutive time so as to place the can seam at one of two or three spots on the electrode, the first or upper eccentric turns through a 180° cycle each time a can passes in front of the pusher element. During the same time interval that the upper cam turns through a 180° cycle, the lower cam turns through part of a 180° cycle.

In the two position embodiment of FIG. 3, each half rotation of the upper cam 17 causes a quarter rotation of the lower cam 22.

This means that the upper eccentric cam has only half as many teeth on its keyed gear 19 as the lower eccentric cam has on its corresponding gear 21. An idler gear is located between these gears to allow the cam gears to be spaced and provide motion reversal between the cammed gears. This gear is not essential to the operation. As shown in FIG. 3, the upper cam is turned so that the crank pin 26 is at its most rearward position. At this point, the crank pin 27 of the lower cam is at the down position. This position corresponds to the position 2–4 shown in FIG. 4.

With the crank starting in the position shown in FIG. 3, the sequence of motion of the elongated element is as shown in FIG. 4. Namely, starting at the point 2—2, the lower cam is in the lower position, the upper eccentric is in the maximum rearward position. At this state, a can with its wing is inserted so that its wing hangs down just in front on the pusher lip 7. Pusher lip 7 is at a maximum rearward position. Next, the cams turn and the elongated element 12 moves forward to assume the position shown as 3,3,3. At this stage, the pusher lip is at a certain point of alignment with the electrode. Now, the upper cam which is at its maximum forward position, begins the next 180° of its rotation. The elongated element assumes the position shown along the line 4—4. At this stage, the upper crank pin 26 is at its most rearward position while the lower crank pin 27 is at its most upper position or half-way between front and rear. The lip 11 is at its rearmost position. Now, a new can with its wing comes in front of the lip. The upper pin 26 rotates to the forward position and the lower crank pin 27 comes to the forward position. At this stage, the lip and elongated member are along the line 1—1. The wing and can have now rotated into a position where the wing and can seam will strike the rotating electrode along the line 1—1. This line is a small distance from the line 3—3 so that the can seam of successive cans are pressed against two different locations on the rotating electrode. the rotating electrode will have two wear spots along its circumference. For this reason, the electrode will last two or more times longer than an electrode without the indexer.

In brief, each time the upper eccentric cam is in its rearmost position, the lower eccentric cam is at the top or bottom of its cycle. When the upper cam is at its forwardmost position, the lower cam is at the front or rear position of its cycle. In this way, when the upper cam is at its rearmost position, the pusher lip is retracted. When the upper cam is at its forward position, the pusher lip is at one of two forwardmost positions.

My embodiment of a three position indexer is shown in FIGS. 5 and 6. In this embodiment, the upper gear 28 mounted on the drive shaft 29 of the first cam 30 has 20 teeth around its perimeter, whereas the gear 31 mounted on the drive shaft 32 of the second cam 33 has 60 teeth around its perimeter. In this case, for each half rotation of the upper gear 28, there is a non-sixth rotation of the lower gear 31.

In this embodiment, the lip pressed against the wing of the unwelded can and moves it to one of three forward positions on the electrode so that electrode wear occurs at one of three positions across the electrode. When the three position indexer is in the position shown in FIG. 5, the lip 7 and elongated member 12 is in the position of 2,2. in FIG. 6. That is to say, the lower crank pin 34 is at its median lowermost position and the upper crank pin 35 is in its most rearward position. FIG. 6 like FIG. 4 is to a larger scale than its corresponding FIG. 5 in order to emphasize the lengths and distances involved. As the upper crank or cam turns to its most forward position, the lower crank turns one-sixths of a revolution. This moves the lower crank to position 3 and the upper crank to its most forward position. Now, the lip and elongated member lie along the line 3—3 and the lip is at its most forward position. The upper crank now turns half a revolution, withdrawing the upper part of the member to its most rearward position and the lower crank moves one-sixth of a revolution. This will place the lip and elongated member along the line 4—4. This sequence of events continues so long as the cranks are rotated. The indexer drive is synchronized with the can forming mechanism so that each time the indexer returns to its rearward position, a can with its wing is inserted in the area immediately in front of the lip. Thus, as the lip moves forward, it will position the can wing edge at one of three positions across the face of the electrode.

The indexer drive and the can forming apparatus are synchronized so that the pusher lip is always at its rearward position when the can wing is advanced to oppose it on the horn.

It is readily appreciated that within the limits of practicality, any number of positions may be indexed across the face of an electrode. The number of positions is limited by the lateral area of the electrode, and the width of the can seam. The seam width across the usual can is about 0.04 inch.

A principal advantage of my seam welding indexer is that one or more consistent paths are worn across the electrode, giving a longer electrode life and causing more complete can seam welding.

The foregoing is a description of an illustrative embodiment of the invention, and it is applicant's intention in the appended claims to cover all forms which fall within the disclosure of the invention.

What is claimed is:

1. A multiple position can welding indexer comprising:
    a mounting means for mounting at least two parallel shafts for rotation;
    at least two spaced shafts extending through said mounting means;
    a first rotary motion transmitting means keyed to a second shaft for being rotated by said first rotary motion transmitting means;
    said second rotary motion transmitting means being in size an integral multiple of said first rotary motion transmitting means whereby for each revolution of said second shaft, said first shaft revolves an integral number of at least two times;
    a first and a second eccentric cam keyed to each of said first and second shafts in such a manner that the position of said first cam means is at its rearmost position at the same time that said second cam means is at its intermediate position;
    an elongated member spaced from said first and second shafts, and having a pusher lip; and
    first and second link means pivotally connected to first and second spaced points of said elongated member and being actuated by said first and second eccentric cam respectively at the other end and movable in response to the rotation of each said eccentric cam and shaft whereby said lip moves between predetermined positions of forward and rearward traverse.

2. A multiple portion can welding indexer as set forth in claim 1 in which:
    a driving means is attached to one of said shafts for rotating said shafts in synchronism with a wing forming drive means whereby for each wing forming cycle, the can welding indexer goes through a complete cycle.

3. A multiple position can welding indexer as set forth in claim 1 in which:
    said first and second rotary motion transmitting means are gears; and
    said second rotary motion transmitting means has teeth the number of which are an integral multiple of the number of teeth of said first rotary motion transmitting means.

4. A multiple position can welding indexer as set forth in claim 1 in which:
    said second rotary motion transmitting means is double the size of said first rotary motion transmitting means whereby for each revolution of said second shaft, said first shaft revolves two times; and
    the rotary motion transmitting means are placed in relation to each other so that the position of said first link means is at its most rearward when said second link means is in its intermediate position.

5. A multiple position can welding indexer as set forth in claim 1 in which:
    said second rotary motion transmitting means is treble the size of said first rotary motion transmitting means whereby for each revolution of said second shaft, said first shaft revolves three times; and
    said first and second rotary motion transmitting means being connected in such a position that when said first link means is at its most rearward position, said second link means is in its intermediate position and said lip moves between three predetermined forward positions and three predetermined rearward positions.

* * * * *